(12) United States Patent     (10) Patent No.: US 9,081,150 B2
Magnusson     (45) Date of Patent: Jul. 14, 2015

(54) RAYLEIGH REFLECTORS AND APPLICATIONS THEREOF

(71) Applicant: Board of Regents, The University of Texas System, Austin, TX (US)

(72) Inventor: Robert Magnusson, Arlington, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 0 days.

(21) Appl. No.: 14/205,578

(22) Filed: Mar. 12, 2014

(65) Prior Publication Data

US 2014/0270638 A1    Sep. 18, 2014

Related U.S. Application Data

(60) Provisional application No. 61/780,004, filed on Mar. 13, 2013.

(51) Int. Cl.
| | |
|---|---|
| *G02B 6/34* | (2006.01) |
| *G02B 6/26* | (2006.01) |
| *G02B 6/42* | (2006.01) |
| *G02B 5/18* | (2006.01) |
| *G02B 6/122* | (2006.01) |
| *G02B 5/28* | (2006.01) |

(52) U.S. Cl.
CPC .. *G02B 6/34* (2013.01); *G02B 5/18* (2013.01); *G02B 5/1809* (2013.01); *G02B 5/1861* (2013.01); *G02B 6/1226* (2013.01); *G02B 5/288* (2013.01)

(58) Field of Classification Search
CPC .............................. G02B 5/1809; G02B 5/288
USPC ........... 385/18, 29, 37, 47; 359/566, 569, 576
See application file for complete search history.

(56) References Cited

U.S. PATENT DOCUMENTS

| | | | | |
|---|---|---|---|---|
| 5,598,300 | A * | 1/1997 | Magnusson et al. | .......... 359/566 |
| 7,352,932 | B1 | 4/2008 | Chang et al. | |
| 8,081,382 | B2 * | 12/2011 | Okada et al. | .................. 359/566 |
| 2006/0262250 | A1 | 11/2006 | Hobbs | |

OTHER PUBLICATIONS

"A new theory of Wood's anomalies on optical gratings," by Hessel et al, Applied Optics, vol. 4, No. 10, pp. 1275-1297, 1965.*

(Continued)

*Primary Examiner* — Robert Tavlykaev
(74) *Attorney, Agent, or Firm* — John P. Zimmer; Smith Moore Leatherwood LLP

(57) ABSTRACT

In one aspect, optical devices and components are described herein. In some embodiments, a device comprises a substrate and a grating layer disposed on the substrate, wherein the grating layer comprises a periodic grating structure and a sublayer beneath the grating structure and adjacent the substrate. In some cases, the sublayer has a small thickness compared to the wavelength of light incident on and/or coupled into the device. For example, the sublayer of a device described herein can have a thickness of less than about 200 nm. Moreover, devices and components described herein can exhibit both guided-mode resonance (GMR) effects and a Rayleigh anomaly and can be used to provide various optical components such as optical couplers, substrate wave couplers, and flat-top angular reflectors or flat-top angular filters.

15 Claims, 12 Drawing Sheets

(56) References Cited

OTHER PUBLICATIONS

Notification of Transmittal of the International Search Report and the Written Opinion of the International Seaching Authority, or the Declaration, International Search Report and Written Opinion of the International Searching Authority for PCT/US2014/023964, mailed Aug. 11, 2014, 10 pages.

* cited by examiner

RAYLEIGH REFLECTORS AND APPLICATIONS THEREOF

CROSS REFERENCE TO RELATED APPLICATION

This application claims priority pursuant to 35 U.S.C. §119 (e) to U.S. Provisional Patent Application Ser. No. 61/780,004, filed on Mar. 13, 2013, which is hereby incorporated by reference in its entirety.

STATEMENT REGARDING FEDERALLY SPONSORED RESEARCH

This invention was made with government support under grant ECCS-0925774 awarded by the National Science Foundation (NSF) and under contract FA9550-10-1-0543 awarded by the United States Air Force Office of Scientific Research.

FIELD

This invention relates to optical devices and, in particular, to optical devices exhibiting guided-mode resonance (GMR) and Rayleigh anomaly properties.

BACKGROUND

Guided-mode resonance (GMR) is an effect in optical physics wherein the guided modes of an optical waveguide can be excited and simultaneously extracted, re-radiated, by the inclusion of a phase-matching element, such as a diffraction grating, in the structure. Such modes are also called "leaky modes," since they do not remain guided but instead can be extracted from the waveguide. Thus, GMR effects can arise via quasi-guided or "leaky" waveguide modes induced on patterned films with subwavelength periods.

The Rayleigh anomaly in optical physics arises on periodic surfaces illuminated by incident electromagnetic waves. Specifically, the "Rayleigh anomaly" refers to the appearance or disappearance of diffracted spectral orders under a variation of the input light frequency or angle. At the transition point between propagating and evanescent orders, characteristic "kinks" appear in the spectra. This effect has been widely regarded as substantially useless or even as a nuisance for many optical applications. For example, the effect can be problematic or troublesome when diffraction gratings are used in the spectroscopic analysis of atomic absorption processes in a medium of interest.

Moreover, the concepts of GMR and the Rayleigh anomaly have not previously been connected or coupled for optical applications. Therefore, there exists a need for improved optical devices capable of productively harnessing the Rayleigh anomaly, including in conjunction with GMR effects. There also exists a need for improved uses and applications of such devices.

SUMMARY

In one aspect, Rayleigh reflector devices are described herein which, in some embodiments, can provide one or more advantages compared to some prior devices. For example, in some embodiments, a device described herein can exhibit extremely sharp angular spectra with unity or near-unity reflectance across wide angular extents. Further, in some cases, diffraction efficiency of the zero-order reflectance of a device described herein is transferred completely or nearly completely to a substrate diffraction order.

A device described herein, in some embodiments, comprises a substrate or substrate layer and a grating layer disposed on the substrate or substrate layer. The grating layer comprises a periodic grating structure and a sublayer beneath the grating structure and adjacent to the substrate or substrate layer. In some embodiments, the sublayer herein has a thickness between about $0.01\lambda$ and about $0.05\lambda$, wherein $\lambda$ is the average wavelength of the electromagnetic radiation incident on the device and/or coupled into the device. Thus, in some cases wherein the incident electromagnetic radiation has a wavelength in the range of about 1000 nm to about 2000 nm, the substrate layer has a thickness of less than about 200 nm. Further, in certain embodiments of a device described herein, the substrate layer has a first refractive index and the grating layer has a second refractive index different than the first refractive index. Moreover, in some instances, the first refractive index is lower than the second refractive index.

In another aspect, various uses and applications of Rayleigh reflector devices are described herein. In some embodiments, for example, a Rayleigh reflector device described herein can form, define, or be used as an optical coupler, such as a substrate wave coupler or a waveguide film coupler. In other instances, a device described herein can be used as an optical reflector or filter, such as a flat-top angular reflector or a flat-top angular filter. A filter defined by a device described herein can be a narrow-line bandpass or bandstop filter. In still other embodiments, a device described herein can be used to provide edge illumination for a display device.

Therefore, in some cases, methods of providing illumination are also described herein. In some embodiments, a method of providing illumination comprises receiving incident electromagnetic radiation at the surface of the grating layer of a Rayleigh reflector device described herein, converting at least about 85% of the incident radiation into a propagating wave within the substrate layer of the device, and emitting the propagating wave from the edge of the substrate layer. The incident radiation can be received at the surface of the grating layer at or near a Rayleigh anomaly angle of the device.

Additionally, in some cases, a propagating substrate wave described herein can be coupled to another optical element or component. Thus, in another aspect, methods of coupling optical components are also described herein. In some embodiments, for instance, a method of coupling optical components comprises providing a first optical component comprising a Rayleigh reflector device described herein, receiving incident electromagnetic radiation at the surface of the grating layer of the device, converting at least about 85% of the incident radiation into a propagating wave within the substrate layer of the device, emitting the propagating wave from the edge of the substrate layer, and receiving the emitted wave with a second optical component. Further, as described above for methods of providing illumination, the incident radiation can be received at the surface of the grating layer at or near a Rayleigh anomaly angle of the device.

A Rayleigh reflector device described herein may also be used as an angular reflector or filter. For example, in some embodiments, a method of reflecting or filtering electromagnetic radiation is described herein, the method comprising receiving incident electromagnetic radiation at the surface of a grating layer of a Rayleigh reflector device described herein, reflecting at least about 85% of the incident radiation having an angle of incidence below a Rayleigh anomaly angle of the device, and converting at least about 85% of the incident radiation having an angle of incidence above the Rayleigh anomaly angle into a propagating wave within the substrate layer of the device.

These and other embodiments are described in more detail in the detailed description which follows.

DETAILED DESCRIPTION

Embodiments described herein can be understood more readily by reference to the following detailed description, examples, and figures. Elements, apparatus, and methods described herein, however, are not limited to the specific embodiments presented in the detailed description, examples, and figures. It should be recognized that these embodiments are merely illustrative of the principles of the present invention. Numerous modifications and adaptations will be readily apparent to those of skill in the art without departing from the spirit and scope of the invention.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10" should generally be considered to include the end points 5 and 10.

Further, when the phrase "up to" is used in connection with an amount or quantity, it is to be understood that the amount is at least a detectable amount or quantity. For example, a material present in an amount "up to" a specified amount can be present from a detectable amount and up to and including the specified amount.

Figure 1:
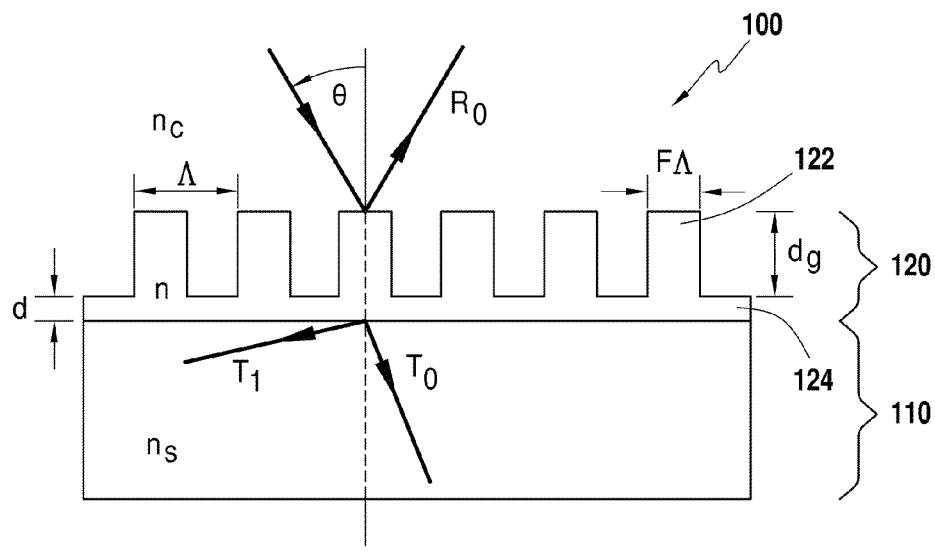
FIG. 1 illustrates a sectional view of a Rayleigh reflector device according to one embodiment described herein.

In one aspect, Rayleigh reflector devices are described herein. A model of one embodiment of a Rayleigh reflector described herein is illustrated schematically in FIG. 1. As illustrated in FIG. 1, a device (100) comprises a substrate layer (110) and a grating layer (120). The grating layer (120) comprises a periodic grating structure (122) and a sublayer (124) beneath the grating structure (122) and adjacent the substrate layer (110). The sublayer (124) can be thin. For example, in some cases, the sublayer can have a thickness of less than about 200 nm. FIG. 1 denotes thicknesses of the sublayer (d) and of the grating structure ($d_g$) and refractive indices of the grating layer (n), the substrate ($n_s$), and a cover material ($n_c$). As illustrated in FIG. 1, the cover material simply consists of air surrounding the device (100) (thus, in this case, $n_c$=1). FIG. 1 further denotes the period ($\Lambda$) and fill factor (F) of the grating layer, with the fill factor being provided as a fraction of the period. In particular, the fill factor for a particular period is expressed as a ratio of the proportion of grating structure relative to the overall period, and may be stated as F, with the measure of filled space in a period represented by F$\Lambda$, as seen in FIG. 1. The angle of incidence ($\theta$) is variable, and the +1 diffraction order is denoted as $T_1$ in the substrate. The zero-order transmitted and reflected waves are denoted as $T_0$ and $R_0$, respectively. In some embodiments, the period ($\Lambda$) of a Rayleigh reflector device described herein can be sufficiently small such that only the zero-order transmitted ($T_0$) and reflected ($R_0$) waves propagate at normal incidence.

In some cases, a Rayleigh reflector device described herein can exhibit guided-mode resonance (GMR) effects and a Rayleigh anomaly. More specifically, in some embodiments, a Rayleigh reflector device described herein can operate as a basic GMR reflector or filter away from the Rayleigh anomaly but exhibit Rayleigh anomaly effects at or near a Rayleigh anomaly angle. Thus, in some instances, such a device can exhibit angular spectra with unity or near unity reflectance that drops abruptly to zero or near zero at the onset of the Rayleigh anomaly. Not intending to be bound by theory, it is believed that Rayleigh reflector devices described herein may be enabled by a rapid, high-efficiency transition from an evanescent to a propagating first-order substrate wave occurring at the Rayleigh angle. Further, the presence of a sublayer, such as a thin and/or high-index sublayer, located adjacent to the substrate layer can affect the angle-dependent and/or wavelength-dependent spectra of the device.

Turning now to specific components of devices, devices described herein comprise a substrate layer. A substrate layer of a Rayleigh reflector device described herein can comprise or be formed of any material not inconsistent with the objectives of the present disclosure. For example, in some embodiments, the substrate layer comprises, consists, or consists essentially of an organic material, such as a polymeric material, or an inorganic material such as glass or another inorganic dielectric medium. In some cases, the substrate layer comprises or is formed from poly(lactic acid), polycarbonate, poly(methylmethacrylate), acrylic glass, silicon, silicon dioxide, fused silica, quartz, crown glass, flint glass, pyrex, or a combination of one or more of the foregoing. Other materials may also be used.

Further, a substrate or substrate layer of a Rayleigh reflector device described herein can have any dimensions, including any thickness, not inconsistent with the objectives of the present invention. For example, in some cases, a substrate or substrate layer has a thickness of up to about 5 mm or up to about 2 mm. In other instances, a substrate or substrate layer has a thickness of less than about 1000 µm or less than about 500 µm. Other thicknesses may also be used. In some embodiments, a thinner substrate or substrate layer may be used when it is desired for the substrate or substrate layer to act as a thin waveguiding layer, such as may be desired for optical coupling applications described herein. In other embodiments, a thicker substrate or substrate layer may be used to provide a desired mechanical strength to the device. Additionally, a substrate layer can have any refractive index not inconsistent with the objectives of the present invention.

Rayleigh reflector devices described herein also comprise a grating layer disposed on the substrate layer. The grating layer comprises a periodic grating structure and a sublayer beneath the grating structure and adjacent to the substrate layer. In some cases, the sublayer is immediately beneath the grating structure and/or immediately adjacent to the substrate layer. Further, the sublayer of a grating layer described herein can have any dimensions not inconsistent with the objectives of the present invention. In some cases, the dimensions of the sublayer are selected based on a desired wavelength of incident radiation to be coupled into or otherwise used with the Rayleigh reflector device. For example, in some instances, the thickness of the sublayer is selected to be small compared to the wavelength of the incident radiation used with or coupled into the device. In some embodiments, the sublayer thickness is chosen based on a ratio of the thickness (d) of the sublayer to the operational wavelength for the Rayleigh reflector device. In some cases, for instance, the sublayer has a thickness (d) between about $0.01\lambda$ and about $0.1\lambda$ or between about $0.01\lambda$ and about $0.05\lambda$, where $\lambda$ is the average wavelength of the radiation incident on the device and/or coupled into the device. In some embodiments, d is between about $0.02\lambda$ and about $0.04\lambda$ or between about $0.025\lambda$ and about $0.035\lambda$. In some cases, the sublayer thickness (d) is less than about 400 nm. In some embodiments, d is less than about 200 nm, less than about 100 nm, or less than about 40 nm. Further, in some embodiments, d is between about 10 nm and about 400 nm, between about 40 nm and about 200 nm, or between about 10 nm and about 100 nm. Moreover, in some embodiments, d is between about 100 nm and about 400 nm, between about 100 nm and about 200 nm, or between about 40 nm and about 80 nm.

Similarly, the periodic grating structure of a grating layer described herein can have any dimensions not inconsistent with the objectives of the present invention. In some cases, for instance, the periodic grating structure thickness ($d_g$) is between about 100 nm and about 1000 nm or between about 100 nm and about 500 nm. In some embodiments, $d_g$ is between about 200 nm and about 500 nm, between about 300 nm and about 700 nm, or between about 300 nm and about 500 nm. Further, in some embodiments, $d_g$ is between about 300 nm and about 1000 nm, between about 400 nm and about 800 nm, or between about 300 nm and about 500 nm. Moreover, in terms of the average wavelength of the radiation incident on the device and/or coupled into the device, $d_g$ can be between about $0.2\times$ and about $2\lambda$.

In addition, a grating structure of a Rayleigh reflector device described herein can be formed with a particular periodicity in order to provide a filter, a polarizer, or a reflector for a desired wavelength or band of light. In some cases, the period ($\Lambda$) is selected to be sufficiently small for only the zero-order transmitted ($T_0$) and reflected ($R_0$) waves to propagate at normal incidence. Further, in some embodiments, Rayleigh reflector devices described herein operate as a GMR reflector at incidence angles away from the Rayleigh anomaly. In such embodiments, $\Lambda$ can be selected such that it has a subwavelength value, such that $\Lambda$ is shorter than the wavelength of the incident light of interest.

Moreover, $\Lambda$ can be selected based on a particular application and/or for a particular subset of wavelengths. In some cases, for instance, Rayleigh reflector devices for infrared applications can have a period $\Lambda$ between about 800 nm and about 1700 nm, between about 800 nm and about 1200 nm, between about 1000 nm and about 1700 nm, or between about 900 nm and about 1300 nm. In some embodiments, Rayleigh reflector devices for applications utilizing visible light can have a period $\Lambda$ between about 200 nm and about 600 nm, between about 200 nm and about 400 nm, between about 300 nm and about 600 nm, or between about 300 nm and about 500 nm. Additionally, in some embodiments, Rayleigh reflector devices for applications utilizing ultraviolet light can have a period $\Lambda$ between about 50 nm and about 300 nm, between about 100 nm and about 200 nm, between about 50 and about 200 nm, or between about 100 nm and about 300 nm. Similarly, the fill factor F can be selected to provide desired operability and/or characteristics for Rayleigh reflector devices described herein. In some cases, for instance, F can be between about 0.05 and about 0.95, between about 0.3 and about 0.6, between about 0.4 and about 0.6, between about 0.3 and about 0.5, or between about 0.1 and about 0.9. Other configurations of the periodic grating structure of a grating layer described herein are also possible.

Further, in some embodiments, a Rayleigh reflector device described herein can comprise a one-dimensional or a two-dimensional periodic grating structure. A "one-dimensional" grating structure, for reference purposes herein, has a repeating grating structure extending in only one direction. Similarly, a "two-dimensional" grating structure, for reference purposes herein, has a repeating grating structure extending in each of two directions. Further, the two directions can be perpendicular. Thus, in some cases, a two-dimensional grating structure comprises or is formed by superimposing two orthogonal one-dimensional grating structures. In such a configuration, the superimposed one-dimensional grating structures can have any structure described hereinabove.

The grating layer of a Rayleigh reflector device described herein can comprise or be formed of any material not inconsistent with the objectives of the present disclosure. In certain embodiments, one or more materials in the grating layer can be selected for its particular properties. In some cases, for example, the grating layer can comprise or be formed of a material selected for its refractive index, such that the refractive index of the grating layer is different than the refractive index of the substrate layer. For example, in some embodiments, the substrate layer can have a first refractive index and the grating layer can have a second refractive index different than the first refractive index. In some cases, the first refractive index is lower than the second refractive index. Moreover, in some embodiments, the materials which comprise or form the substrate layer and the grating layer can be selected to achieve a desired ratio of refractive indices. In some embodiments, for instance, the ratio of the first refractive index to the second refractive index can be between about 1.5 and about 3, between about 2 and about 3, or between about 1.5 and about 2.5. In some embodiments, the ratio can be between about 2 and about 2.5, between about 2.1 and about 2.4, or between about 2.3 and about 2.4. In addition, in some cases, the first refractive index is between about 1 and about 3 or between about 1 and about 2. Similarly, in some embodiments, the second refractive index is between about 2 and about 5, between about 2 and about 4, or between about 3 and about 4. Other refractive indices may also be used.

Moreover, it is to be understood that the periodic grating structure and the sublayer of a grating layer described herein can be formed from the same material and/or have the same refractive index. In this manner, the grating layer can exhibit a unitary refractive index, rather than exhibiting a plurality of differing refractive indices, such as a plurality of differing refractive indices corresponding to differing regions of the grating layer. In some embodiments, the grating layer comprises, consists, or consists essentially of silicon or germanium. Other materials may also be used.

While certain embodiments of Rayleigh reflector devices described herein can comprise a grating layer disposed on and immediately adjacent to a substrate layer, some embodiments further comprise one or more additional layers disposed between the substrate layer and the grating layer. The one or more additional layers disposed between the substrate layer and the grating layer can have any thickness and can comprise or be formed from any material not inconsistent with the objectives of the present invention. For example, in some embodiments, the one or more additional layers disposed between the substrate layer and the grating layer comprise, consist, or consist essentially of poly(lactic acid), polycarbonate, poly(methylmethacrylate), acrylic glass, silicon, silicon dioxide, crown glass, flint glass, pyrex, or a combination of one or more of the foregoing. Other materials may also be used, including other materials having other refractive indices. It is further to be understood that the composition of an additional layer disposed between the substrate and the grating layer, in some cases, is chosen based on a desired refractive index of the additional layer, including relative to the refractive index of the grating layer and/or the substrate of the device. Such additional layers, in some cases, can be used to tailor the response of a Rayleigh reflector device in the spectral or angular domain as needed or desired for a particular application. For example, a wider-band device may be obtained by including one or more additional layers described hereinabove. Moreover, in some instances, the inclusion of such additional layers may reduce the sideband reflectance of a Rayleigh reflector device described herein.

Further, some embodiments of Rayleigh reflector devices described herein can comprise one or more additional layers on top of the grating layer. In some cases, for instance, a cover material may be disposed on top of the grating layer. An additional layer disposed on top of the grating layer can comprise or be formed from any material not inconsistent with the objectives of the present invention. In some cases, for instance, an additional material disposed on top of the grating layer can comprise an adhesive. In other instances, an additional material disposed on top of the grating comprises a gas, such as air or another gas. In some embodiments, an additional material comprises a liquid, such as water or an oil such as silicone oil. Moreover, it is to be understood that the composition of an additional layer disposed on top of the grating layer, in some cases, is chosen based on a desired refractive index of the additional layer, including relative to the refractive index of the grating layer and/or the substrate layer of the device. Such additional layers or surrounding media can, in some instances, define the immediate environment of the device, thereby permitting the device to operate as intended in specific liquid or gas surroundings, as needed or desired for specific applications.

Design parameters and/or materials of Rayleigh reflector devices described herein can be selected such that the devices exhibit certain desirable properties and/or characteristics. Parameters of devices described herein which can be selected for operability of Rayleigh reflector devices can include d, $d_g$, n, $n_c$, $n_s$, $\Lambda$, and F. One particular property or characteristic which can, in some embodiments, be achieved is extremely sharp angular spectra with unity or near-unity reflectance across wide angular extents. Further, in some embodiments, diffraction efficiency of the zero-order reflectance is transferred completely or nearly completely to a substrate diffraction order. In some embodiments, Rayleigh reflector devices described herein exhibit an abrupt drop in reflectance of incident electromagnetic radiation at the angle corresponding to the Rayleigh anomaly. Further, in some embodiments, Rayleigh reflector devices described herein can exhibit high diffraction efficiency of the zero-order reflection below the Rayleigh anomaly angle of the device. For the purposes of the description of devices and methods described herein, "above" or "below" the Rayleigh anomaly angle of a device refers to the absolute value of the angle of incidence relative to the absolute value of the Rayleigh anomaly angle of the device for a particular wavelength. For example, an angle of incidence of ±1° can be considered to be "below" a Rayleigh angle of ±5°, and an angle of incidence of ±6° can be considered "above" a Rayleigh angle of ±5°. In some cases, devices described herein exhibit a diffraction efficiency of the zero-order reflection of at least about 85%, at least about 90%, or at least about 95%. In some embodiments, devices described herein exhibit a diffraction efficiency of the zero-order reflection of between about 85% and about 95%, between about 85% and about 90%, or between about 90% and about 95%.

Moreover, parameters can be designed or adjusted in Rayleigh reflector devices described herein to provide desired properties or characteristics. For example, a target wavelength ($\lambda_R$) can be selected and the device formed such that a Rayleigh anomaly occurs at normal incidence ($\theta=0$) of light having the target wavelength $\lambda_R$. The device can be formed to provide this result by adjusting $n_s$ and $\Lambda$ using the relationship of Equation (1):

$$\lambda_R = n_s \Lambda \qquad (1).$$

In another example, a specific desired Rayleigh anomaly angle ($\theta_R$) at which the $T_1$ wave begins propagating can be selected and adjusted for by altering the parameters $n_s$, $\lambda$, and $\Lambda$ using the relationship of Equation (2):

$$\sin \theta_R = -n_s + \lambda/\Lambda \qquad (2).$$

Various components of devices have been described herein. It is to be understood that a device according to the present invention can comprise any combination of components and features not inconsistent with the objectives of the present invention. For example, in some cases, a device described herein can comprise any substrate described herein in combination with any periodic grating structure described herein and any sublayer described herein. Further, in some cases, the combination of a specific substrate layer, periodic grating structure, and/or sublayer of a device is based on a desired wavelength of electromagnetic radiation to be incident on, coupled into, or otherwise used with the device, including in a manner described by Equations (1) and (2).

A Rayleigh reflector device described herein can be made in any manner not inconsistent with the objectives of the present invention. In some instances, for example, a photolithography process is used to fabricate a device described herein. In one exemplary photolithography process, the substrate layer of the device (such as a glass substrate layer) is coated with a film of grating layer material. The film is then selectively etched to a desired depth (such as by using an acid etching process). Selective etching can be achieved using one or more masking steps. Moreover, in some embodiments, a holographic interferometer is used to pattern a grating layer onto a deposited photoresist. In other embodiments, a device described herein is formed by e-beam lithography, wherein an electron beam can be used to selectively write a desired grating pattern directly onto a coated layer. Additionally, as understood by one of ordinary skill in the art, it is also possible to form a device described herein using a mechanical process, such as a micromachining process. Sputtering or other physical deposition techniques may also be used as part of a process of making a Rayleigh reflector device described herein.

Devices described herein can be used in a variety of optical applications and/or to form a variety of optical components. For example, in some cases, a device described herein can be used in an optical coupling, reflecting, or filtering process. Thus, in another aspect, specific methods and uses of Rayleigh reflector devices are described herein. In some embodiments, for instance, a Rayleigh reflector device described herein can form or be used as an optical coupler such as a substrate wave coupler. In other instances, a device described herein can be used as an optical reflector or filter, such as a flat-top angular reflector or a flat-top angular filter. In still other embodiments, a device described herein can be used to provide edge illumination for a display device.

Therefore, in some cases, methods of providing illumination are described herein. In some embodiments, a method of providing illumination comprises receiving incident electromagnetic radiation at the surface of the grating layer of a Rayleigh reflector device described herein, converting at least about 85% of the incident radiation into a propagating wave within the substrate of the device, and emitting the propagating wave from the edge of the substrate. Any Rayleigh reflector device described herein can be utilized in methods of providing illumination described herein. For example, in one embodiment, a Rayleigh reflector device utilized in methods of providing illumination described herein can comprise a substrate layer and a grating layer disposed on the substrate layer, the grating layer comprising a periodic grating structure and a sublayer beneath the grating structure and adjacent the substrate layer, wherein the sublayer has a thickness of less than about 200 nm.

Turning now to further steps of methods described herein, the incident radiation can be received at the surface of the grating layer at or near a Rayleigh angle of the device. A "surface" of a grating layer of a Rayleigh reflector device described herein comprises the portion of the grating layer which is disposed opposite the substrate layer, and which faces the source of incident radiation. The term "at or near a Rayleigh anomaly angle" can, in some embodiments, include incident radiation received up to about 2 degrees above or below the Rayleigh anomaly angle of the device. In some cases, for instance, incident radiation can be received at the surface of the grating layer between about −2 degrees and about +2 degrees from the Rayleigh anomaly angle, between about −1 degree and about +1 degree from the Rayleigh anomaly angle, or between about −0.5 degrees and about +0.5 degrees from the Rayleigh anomaly angle. Further, in some cases, incident radiation can be received at the surface of the grating layer between about −2 degrees and about +1 degree from the Rayleigh anomaly angle, between about −1 degree and about +2 degrees from the Rayleigh anomaly angle, between about −0.5 degrees and about +2 degrees from the Rayleigh anomaly angle, or between about −2 degrees and about +0.5 degrees from the Rayleigh anomaly angle. As noted above in Equation (2), for a particular Rayleigh reflector device, a Rayleigh anomaly angle can be expressed as $\sin\theta_R = -n_s + \lambda/\Lambda$, where $\theta_R$ is the Rayleigh anomaly angle, $n_s$ is the refractive index of the substrate, $\lambda$ is the average wavelength of the incident radiation, and $\Lambda$ is the period of the grating layer.

The incident electromagnetic radiation can be converted into a propagating substrate wave in any manner not inconsistent with the objectives of the present invention. In some cases, for instance, converting radiation incident on a device into a propagating wave comprises diffracting the incident radiation into a propagating wave. For example, converting the incident radiation can comprise diffracting the incident radiation into the $T_1$ wave. Further, in some cases, methods of providing illumination described herein comprise converting at least about 85% of the incident radiation into a propagating wave within the substrate of the device. In other embodiments, at least about 90% or at least about 95% of the incident radiation is converted into a propagating wave within the substrate layer. In some instances, between about 85% and about 95%, between about 85% and about 90%, between about 90% and about 95%, or between about 95% and about 99% of the incident radiation is converted into a propagating wave within the substrate of the device. Moreover, for the objectives of the present disclosure, percentage values of reflected, converted, and/or diffracted light can be relative to the amount of incident light received at the surface of the grating layer of a device described herein, including at a specified angle of incidence.

Similarly, emitting the propagating wave from the edge of the substrate layer can be carried out in any manner not inconsistent with the objectives of the present invention. Further, an "edge" of the substrate, for reference purposes herein, is a terminus of the substrate layer lying in a plane substantially perpendicular to the surface of the grating layer. Thus, an edge can correspond to a thickness of the substrate layer. Illumination emanating from an edge of a substrate layer of a device described herein can be used to provide holograms, or can be used in other types of display devices.

In addition to illumination applications, Rayleigh reflector devices described herein can also be used for optical coupling applications. Specifically, in some cases, a propagating substrate wave described herein can be coupled into another optical element or component after the wave is emitted from the substrate layer of the device. Thus, in some embodiments, a method of coupling optical components is described herein, the method comprising providing a first optical component comprising a Rayleigh reflector device described herein, receiving incident electromagnetic radiation at the surface of the grating layer of the device, converting at least about 85% of the incident radiation into a propagating wave within the substrate layer of the device, emitting the propagating wave from the edge of the substrate, and receiving the emitted wave with a second optical component. As described above for methods of providing illumination using a device described herein, the incident radiation can be received at the surface of the grating layer at or near a Rayleigh anomaly angle of the device. Further, as described above for methods of providing illumination, any Rayleigh reflector device described herein can be utilized for coupling optical components. For example, in one embodiment, a Rayleigh reflector device utilized in an optical coupling application can comprise a substrate layer and a grating layer disposed on the substrate layer, the grating layer comprising a periodic grating structure and a sublayer beneath the grating structure and adjacent the substrate layer, wherein the sublayer has a thickness of less than about 200 nm.

A Rayleigh reflector device described herein may also be used as an angular reflector or filter. For example, in some embodiments, a method of reflecting or filtering electromagnetic radiation is described herein, the method comprising receiving incident electromagnetic radiation at the surface of a grating layer of a Rayleigh reflector device described above, reflecting at least about 85% of the incident radiation having an angle of incidence below a Rayleigh anomaly angle of the device, and converting at least about 85% of the incident radiation having an angle of incidence above the Rayleigh anomaly angle into a propagating wave within the substrate layer of the device.

Dependent upon the angle of incidence of the incident radiation, at least about 85% of the incident radiation can be reflected within a particular angular range. In some cases, for example, incident radiation with an angle of incidence higher than, or above, the Rayleigh angle for the device can result in reduced reflection of the incident radiation forming the edge of the filter. In some embodiments, at least about 85% of incident radiation can be reflected within the desired angular region or band below the Rayleigh angle. However, other diffraction efficiencies are also possible. In some cases, for example, at least about 90% or at least about 95% of incident radiation is reflected or converted. In some embodiments, between about 85% and about 95% of incident radiation, between about 90% and about 95% of incident radiation, between about 85% and about 95%, or between about 95% and about 99% of incident radiation is reflected within the angular band.

As described above for methods of providing illumination, any Rayleigh reflector device described herein can be utilized as an angular reflector or filer. For example, in one embodiment, the Rayleigh reflector device can comprise a substrate layer and a grating layer disposed on the substrate layer, the grating layer comprising a periodic grating structure and a sublayer beneath the grating structure and adjacent the substrate layer, wherein the sublayer has a thickness of less than about 200 nm.

Some embodiments described herein are further illustrated in the following non-limiting examples.

EXAMPLE 1

Rayleigh Reflector Device

A Rayleigh reflector device having the general structure of FIG. 1 is described and its optical characteristics theoretically determined as follows. The grating layer of the device is formed by a partially etched silicon film disposed on a glass substrate layer. The sublayer adjacent the substrate layer has a controllable thickness. The refractive index of the silicon layer is taken to be a constant at n=3.48. The substrate index of refraction is considered to be $n_s$=1.5. The cover material index is $n_c$=1 for operation in air. In addition, for this device, $d_g$=429 nm, d=60 nm, Λ=1260 nm, and F=0.51. Initially, for simplicity, the device parameters were chosen such that only the ±1 diffraction orders can exist in the substrate layer. The device was designed to be a wideband reflector operating in the 1.8-2.4 µm spectral region.

Optical characteristics of the foregoing device were determined computationally. Specifically, the following computed results were obtained by applying a rigorous coupled-wave analysis (RWCA), as described in Moharam et al., "Stable implementation of the rigorous coupled-wave analysis for surface-relief gratings: enhanced transmittance matrix approach," *J. Opt. Soc. Am. A*, volume 12, pages 1077-1086 (1995). In this Example, the foregoing device is taken to be exposed to incident light having transverse-electric (TE) polarization for which the light has an electric field vector normal to the plane of incidence. However, other incident light polarization could also be used in the calculation. Ignoring dispersion can be shown to have relatively minor effects on the results presented.

Figure 2:
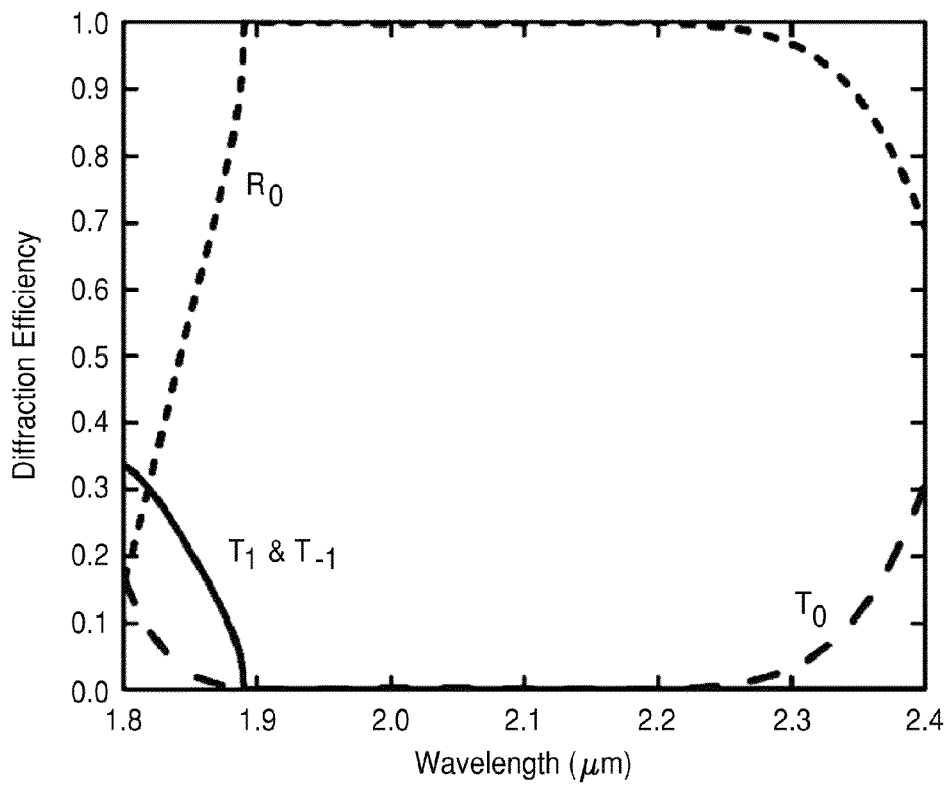
FIG. 2 illustrates a calculated spectral response of a Rayleigh reflector device according to one embodiment described herein.

FIG. 2 illustrates the diffraction efficiency spectrum of the waves of chief interest as per FIG. 1. At normal incidence (θ=0), the Rayleigh anomaly occurs at wavelength $\lambda_R=n_s\Lambda$=1.89 µm, as evident in FIG. 2.

Figure 3:
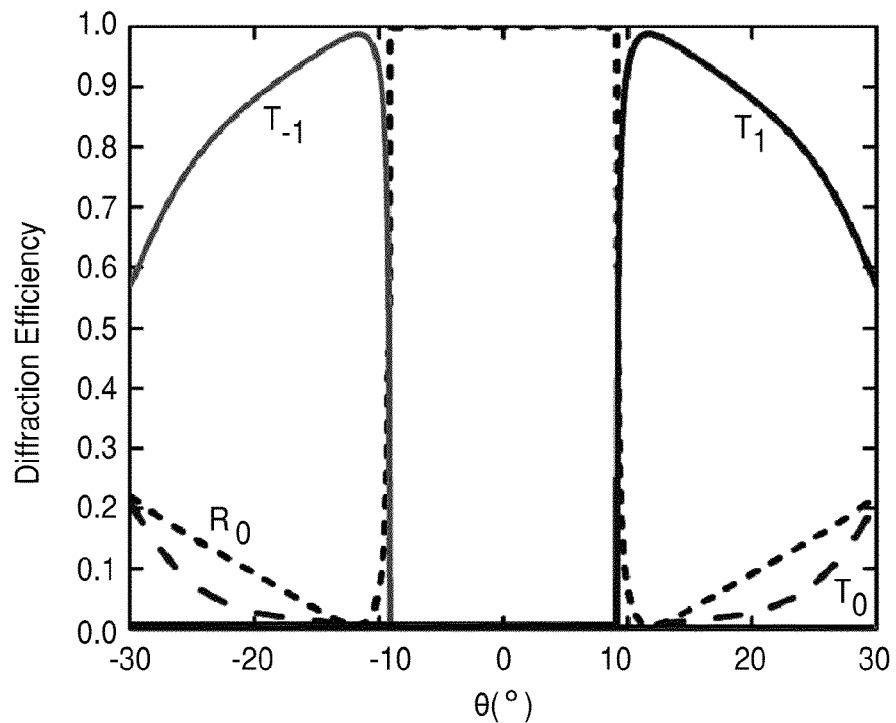
FIG. 3 illustrates a calculated angular spectrum of a Rayleigh reflector device according to one embodiment described herein.

Correspondingly, for an arbitrary wavelength, the $T_1$ wave begins propagating at a Rayleigh angle expressed according to Equation (2) above. Thus, at λ=2090 nm, $\theta_R$=9.13°. FIG. 3 shows the attendant angular spectrum. A high-efficiency (theoretically 100%) flat-top reflectance spectrum with extremely sharp angular edges was observed. Not intending to be bound by theory, it is believed that an important factor for this behavior may be the rapid rise in the diffraction efficiency of the substrate orders, which approaches 100% in this case. This efficiency is high across an angular band spanning nearly 10 degrees, as shown in FIG. 3. It is noted that the zero-order transmittance $T_0$ is low near the filter edges as the first-order draws most of the power.

Figure 4:
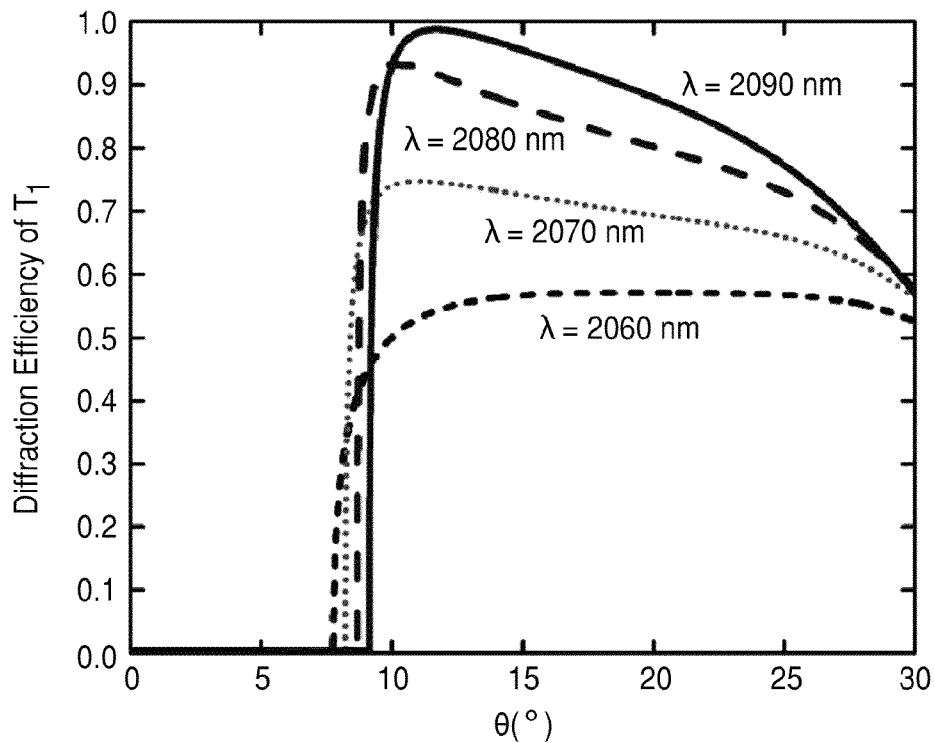
FIG. 4 illustrates a calculated $R_0$-$T_1$ transition as a function of illumination wavelength of a Rayleigh reflector device according to one embodiment described herein.

As described hereinabove, the foregoing optical effects can be sensitive to the device parameters and operating conditions. This sensitivity was explored by varying the operating wavelength. The results are shown in FIG. 4, which illustrates the onset of the $T_1$ wave in angle. For a 30 nm variation in the wavelength, there is considerable deviation in the maximum efficiency attained. In each case, the rate of change in the efficiency with angle is high, yielding near vertical spectral edges, as shown in FIG. 4.

Again not intending to be bound by theory, it is believed that an important parameter may be the sublayer of thickness d in FIG. 1. In some cases, this thickness is small compared to the scale of the wavelength. For θ<$\theta_R$, there is only power in the $R_0$ wave. On transition across the Rayleigh angle, all of this power is potentially available for distribution among other allowed propagating orders. Thus, in some embodiments, the sublayer may operate to critically shape the local field structure.

Figure 5:
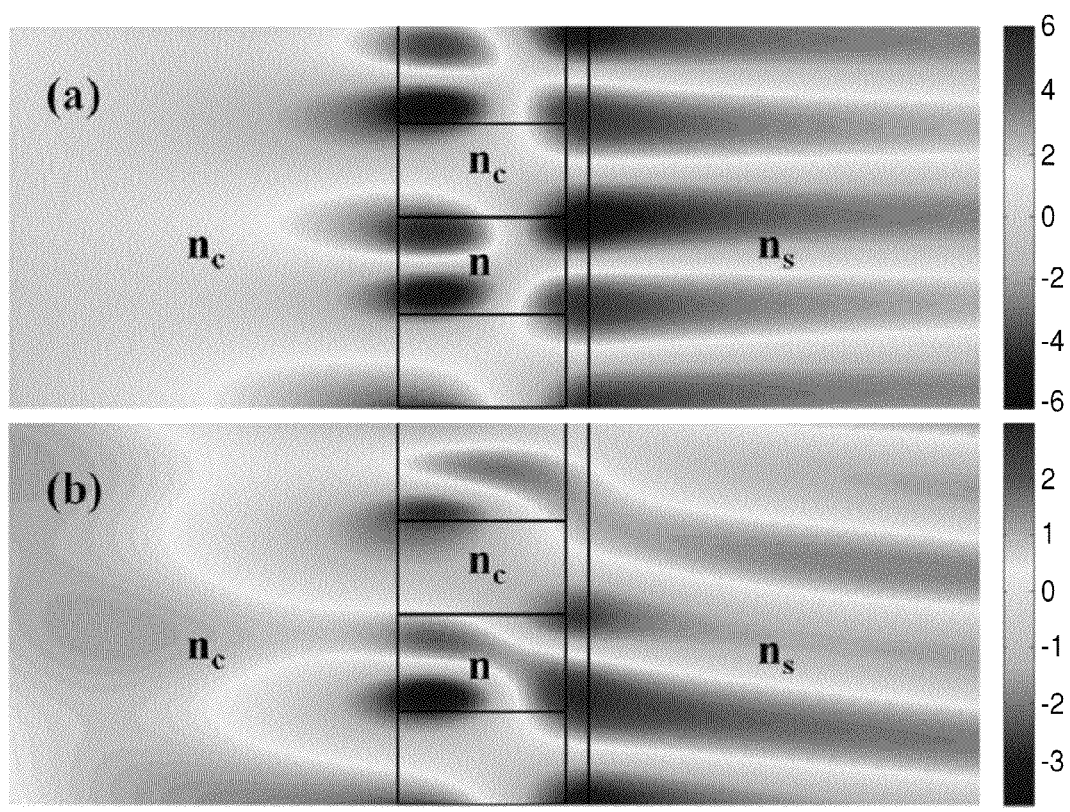
FIGS. 5(a) and 5(b) illustrate internal electric field distributions associated with a Rayleigh reflector device according to one embodiment described herein.

FIG. 5 provides a view of the internal electric-field amplitude at a representative instant of time. FIG. 5(a) shows the field arrangement corresponding to the point θ=9° and λ=2090 nm in FIG. 4; that is, before switching on the $T_1$ diffraction order. The local mode structure has a $TE_1$ character in a dual sense, that is along the propagation direction (grating normal) and transversely, as the field within the high-index grating bar has that shape as well. Considerable power concentration is noted in the device, with the scale bar indicating an approximate 6× enhancement relative to the input excitation wave amplitude. Moreover, the field is in precarious equilibrium with a long evanescent tail reaching into the substrate. Setting θ=12°, as in FIG. 5(b), depicts the situation post-switching to a propagating $T_1$-order. FIG. 5(b) shows a greatly altered field configuration and lowered amplitudes.

Figure 6:
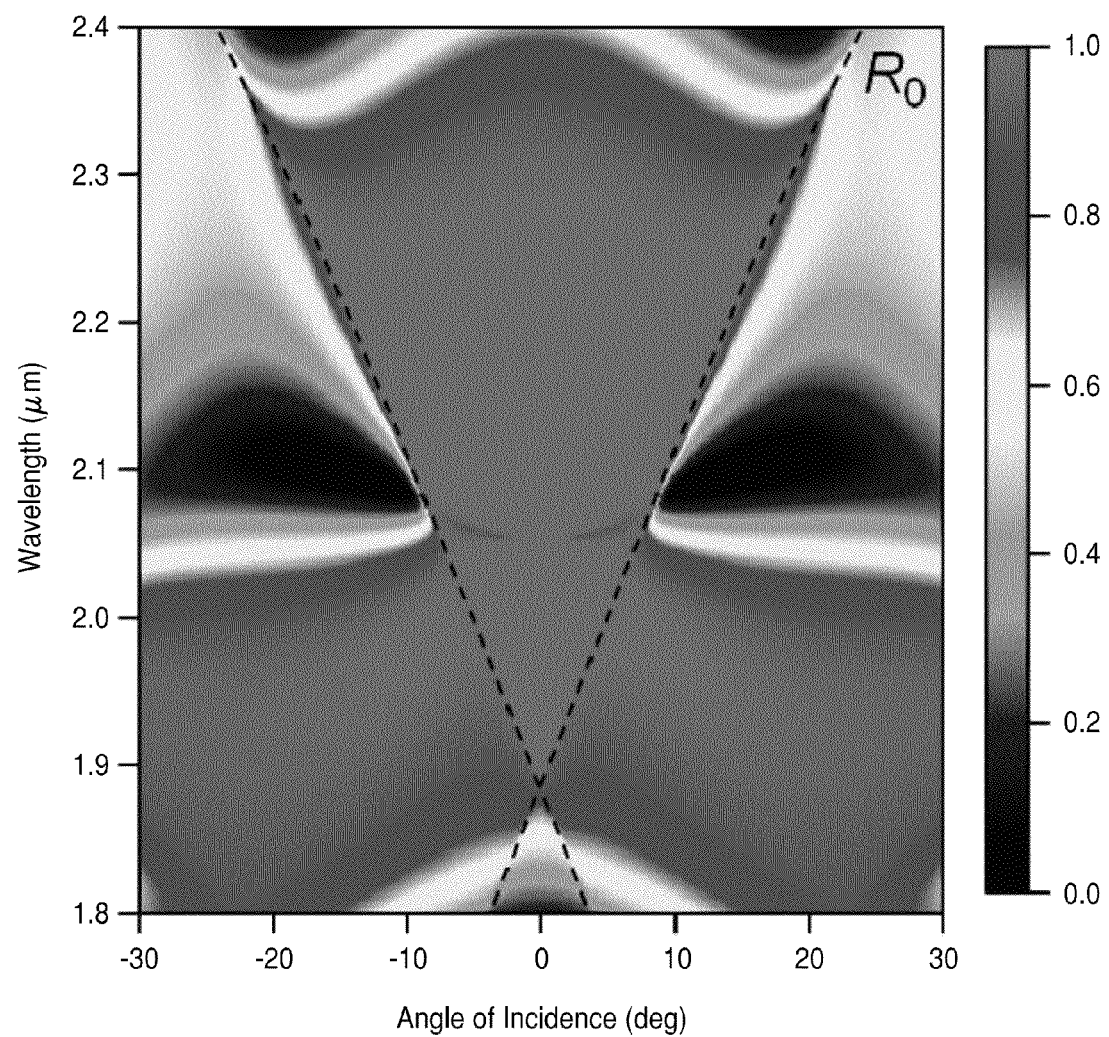
FIG. 6 illustrates a reflectance map of a Rayleigh reflector device according to one embodiment described herein.

FIG. 6 shows a global view in wavelength and angle of the reflectance of the Rayleigh device. Variation of the operational wavelength affects the extant and shape of the angular corridor. Whereas extensive wideband high-efficiency flat-top spectral regions exist, sharp filter sidewalls, such as those in FIG. 3, are seen only near the 2.1 μm wavelength.

EXAMPLE 2

Rayleigh Reflector Device

Figure 7:
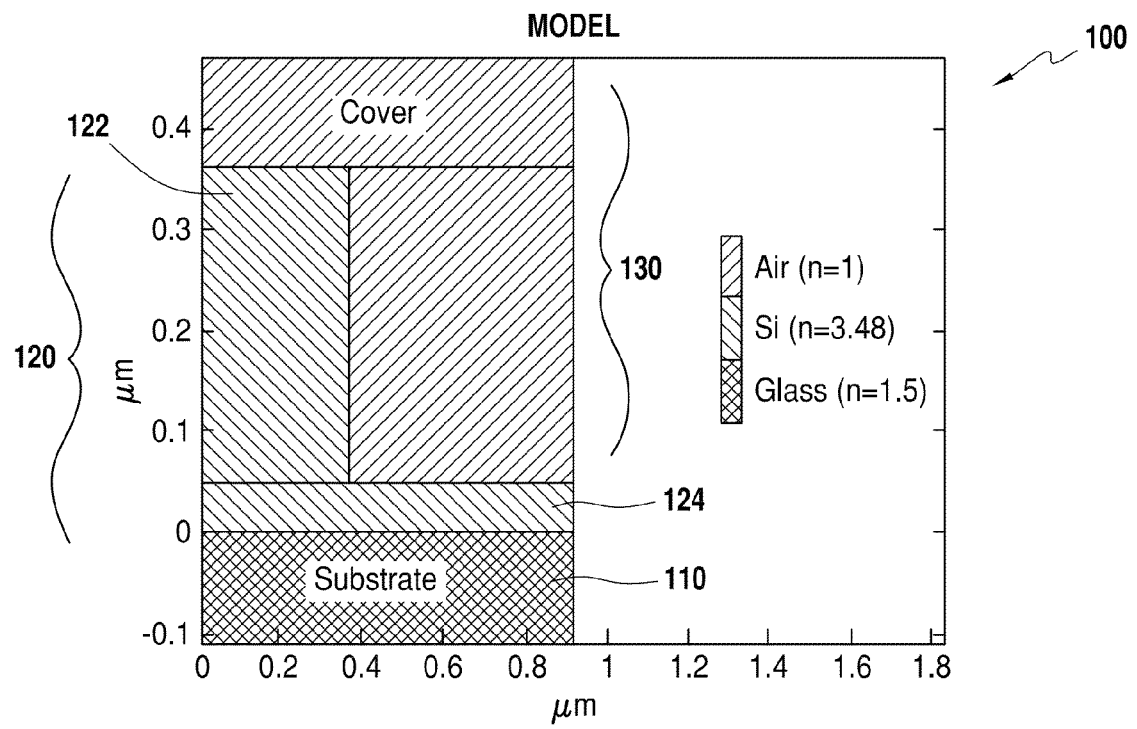
FIG. 7 illustrates a sectional view of a portion of a Rayleigh reflector device according to one embodiment described herein.

A Rayleigh reflector device having the structure of FIG. 7 is described and its optical characteristics theoretically determined as follows. The grating layer of the device is formed by a partially etched silicon film disposed on a glass substrate layer. The sublayer adjacent the substrate layer has a controllable thickness. FIG. 7 schematically illustrates the model of one period (Λ) of the device. The Rayleigh reflector device (100) of FIG. 7 comprises a substrate layer (110) and a grating layer (120) disposed on the substrate (110), the grating layer (120) comprising a periodic grating structure (122) and a sublayer (124) beneath the grating structure (122) and adjacent the substrate (110). In this simulation, the substrate is of infinite thickness, and only a portion of it is shown in FIG. 7. In addition, as illustrated in FIG. 7, only one ridge or feature of the periodic grating structure (122) is shown. The cover (130) in the embodiment of FIG. 7 is air. As in Example 1, we take the refractive index of the silicon layer to be a constant at n=3.48 and set the substrate index to $n_s$=1.5. The cover index is $n_c$=1 for operation in air. The parameters utilized in the embodiment of FIG. 7 further include $d_g$=313 nm, which corresponds to the thickness of the periodic grating structure (122), d=50 nm, which corresponds to the thickness of the sublayer (124), grating period Λ=918 nm, which corresponds to the width of the model illustrated in FIG. 7, and fill factor F=0.4. In addition, as described in Example 1, the subsequent RCWA study was limited to incident light with transverse-electric (TE) polarization for which the light has an electric field vector normal to the plane of incidence.

Figure 8:
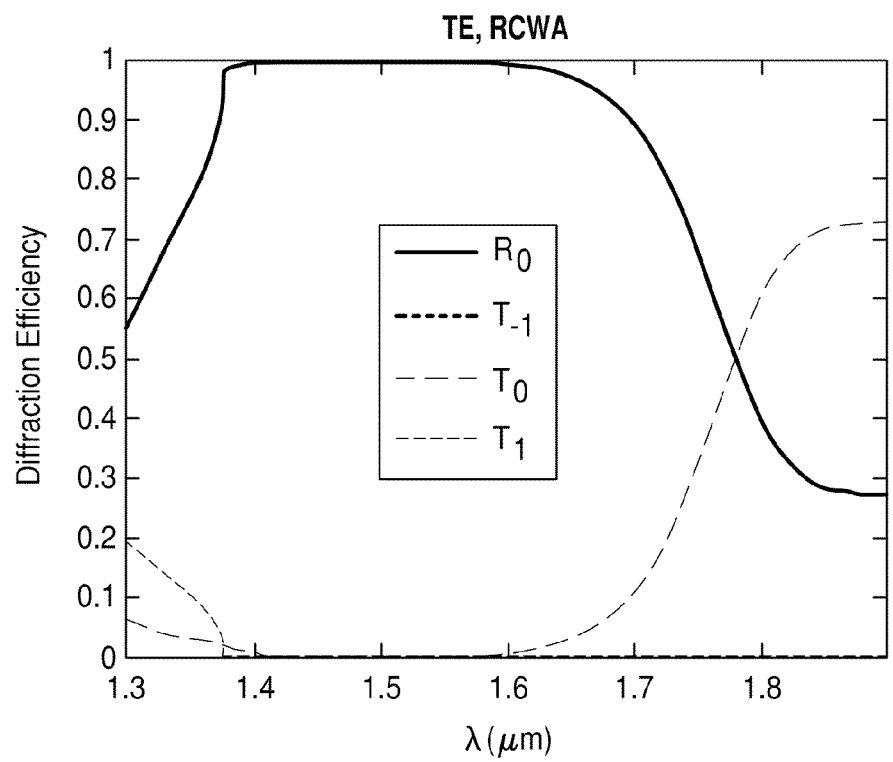
FIG. 8 illustrates a calculated spectral response of the device of FIG. 7.

FIG. 8 illustrates the diffraction efficiency spectrum of the waves of chief interest for TE-polarized incident light at normal incidence, with the computed results found by application of RWCA as described in Example 1. At normal incidence (θ=0), the Rayleigh anomaly occurs at wavelength $\lambda_R=n_s\Lambda$=1.38 μm as evident in FIG. 8.

Figure 9:
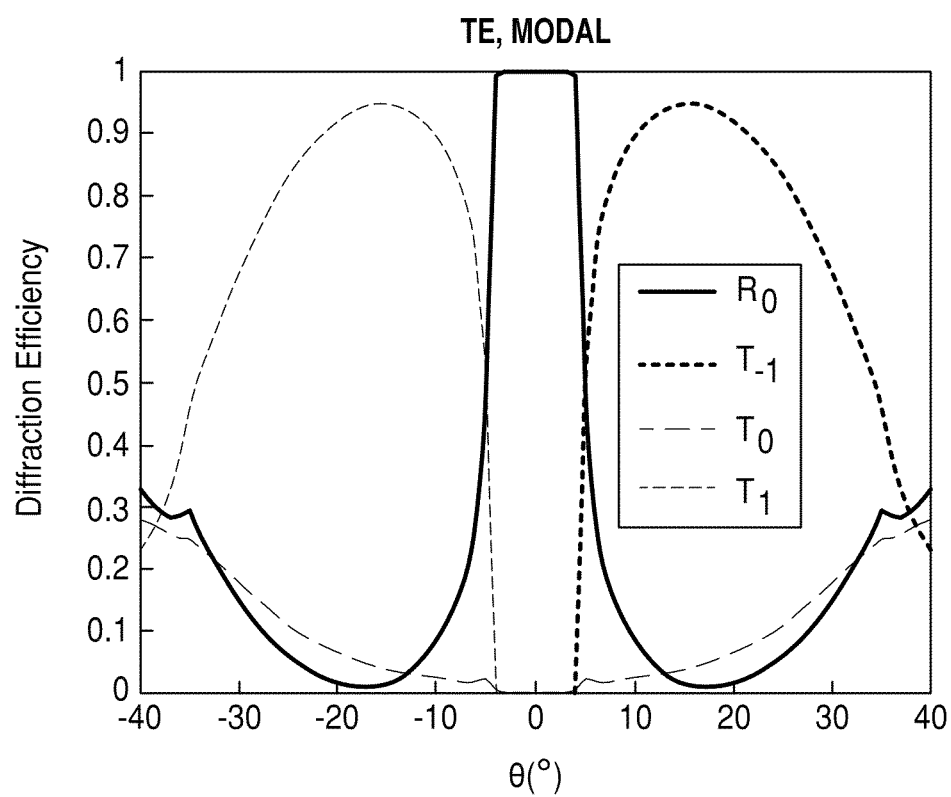
FIG. 9 illustrates a calculated angular spectrum of the device of FIG. 7.

Correspondingly, for an arbitrary wavelength, the $T_1$ wave begins propagating at a Rayleigh angle expressed according to Equation (2) above. Thus, at λ=1450 nm, $\theta_R$=4.6°. FIG. 9 shows the attendant angular spectrum. A high-efficiency (theoretically 100%) flat-top reflectance spectrum with extremely sharp angular edges was observed. Not intending to be bound by theory, it is again believed that an important factor for this behavior may be the rapid rise in the diffraction efficiency of the substrate orders, which approaches 95% in this case. This efficiency is high across an angular band spanning a few degrees, as shown in FIG. 9. As in Example 1, it is noted that the zero-order transmittance $T_0$ is low near the filter edges as the first-order draws most of the power.

Figure 10:
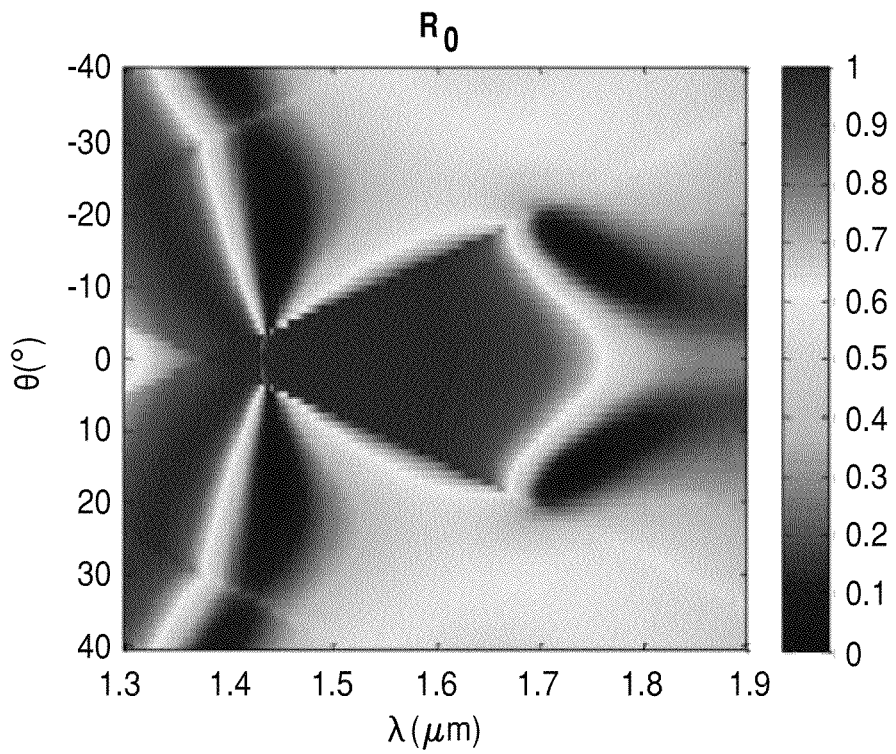
FIG. 10 illustrates an angle-wavelength 2D plot of zero-order reflectance $R_0$ of the device of FIG. 7.
Figure 11:
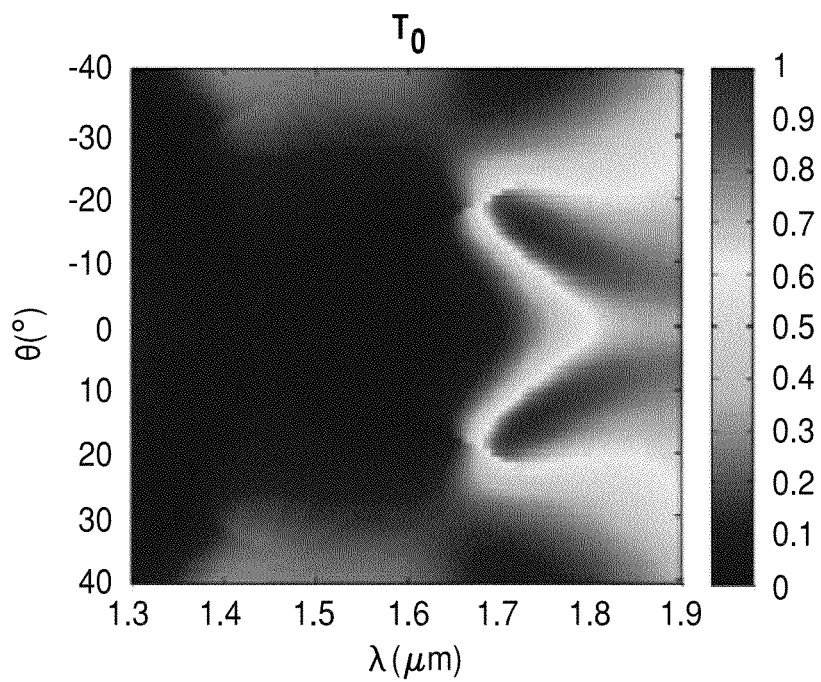
FIG. 11 illustrates an angle-wavelength 2D plot of zero-order transmittance $T_0$ of the device of FIG. 7.
Figure 12:
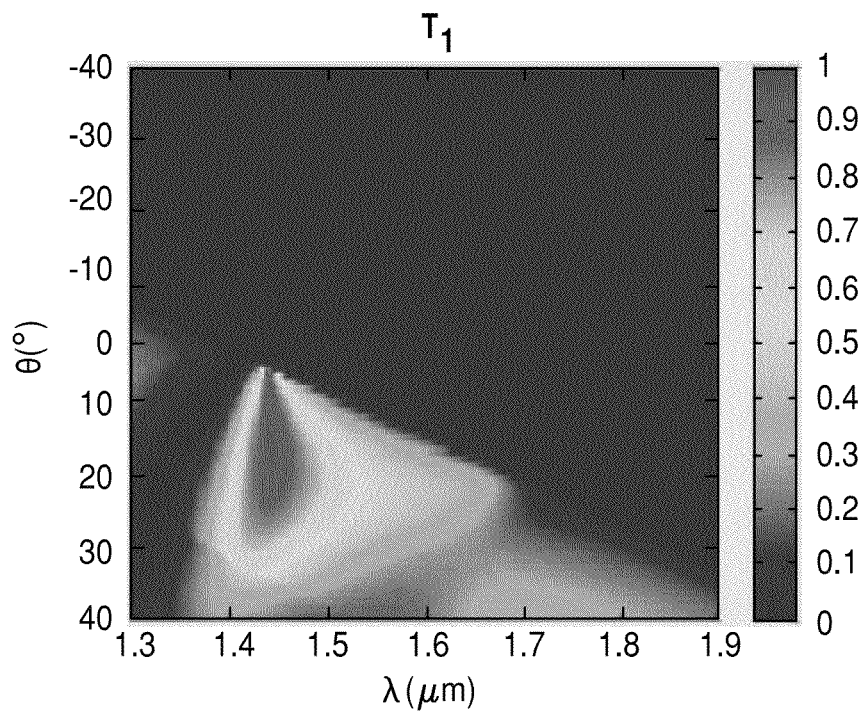
FIG. 12 illustrates an angle-wavelength 2D plot of first substrate order wave $T_1$ of the device of FIG. 7.
Figure 13:
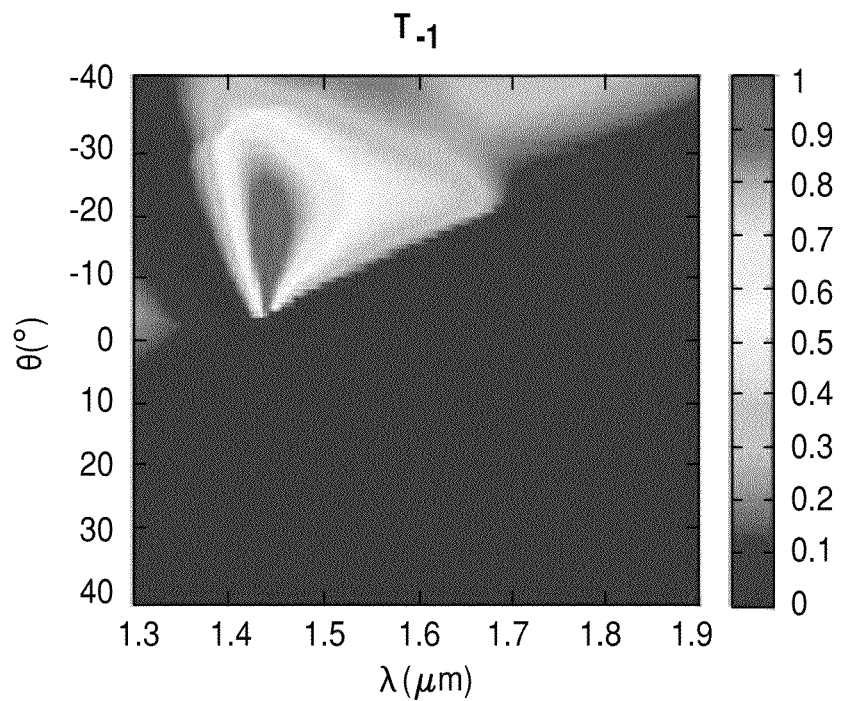
FIG. 13 illustrates an angle-wavelength 2D plot of negative first substrate order wave $T_{-1}$ of the device of FIG. 7.

FIG. 10 illustrates an angle-wavelength 2D plot of zero-order reflectance $R_0$ for the device. FIG. 11 illustrates an angle-wavelength 2D plot of zero-order transmittance $T_0$ for the device. FIG. 12 illustrates an angle-wavelength 2D plot of first substrate order wave $T_1$ for the device. FIG. 13 illustrates an angle-wavelength 2D plot of the negative first substrate order wave ($T_{-1}$) for the device.

EXAMPLE 3

Rayleigh Reflector Device

Figure 15:
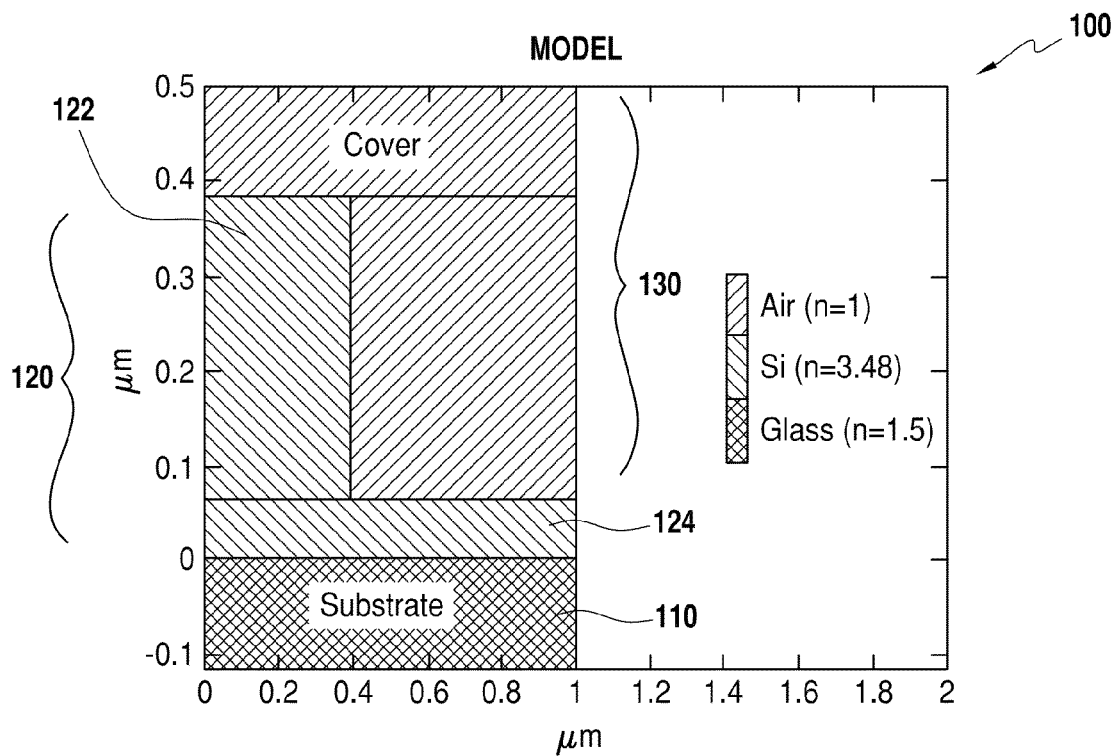
FIG. 15 illustrates a sectional view of a portion of a Rayleigh reflector device according to one embodiment described herein.

A Rayleigh reflector device having the structure of FIG. 15 is described and its optical characteristics theoretically determined as follows. The grating layer of the device is formed by a partially etched silicon film disposed on a glass substrate layer. The sublayer adjacent the substrate layer has a controllable thickness. FIG. 15 schematically illustrates the model of one period (Λ) of the device. The Rayleigh reflector device (100) of FIG. 15 comprises a substrate (110) and a grating layer (120) disposed on the substrate (110), the grating layer (120) comprising a periodic grating structure (122) and a sublayer (124) beneath the grating structure (122) and adjacent the substrate (110). In this simulation, the substrate is of infinite thickness, and only a portion of it is shown in FIG. 15. In addition, as illustrated in FIG. 15, only one ridge or feature of the periodic grating structure (122) is shown. The cover (130) in the embodiment of FIG. 15 is air. As in Example 1, we take the refractive index of the silicon layer to be a constant at n=3.48 and set the substrate index to $n_s$=1.5. The cover index is $n_c$=1 for operation in air. The parameters utilized in the embodiment of FIG. 15 include $d_g$=320 nm, which corresponds to the thickness of the periodic grating structure (122), d=65 nm, which corresponds to the thickness of the sublayer (124), grating period Λ=1000 nm, which corresponds to the width of the model illustrated in FIG. 15, and fill factor F=0.4.

Figure 17:
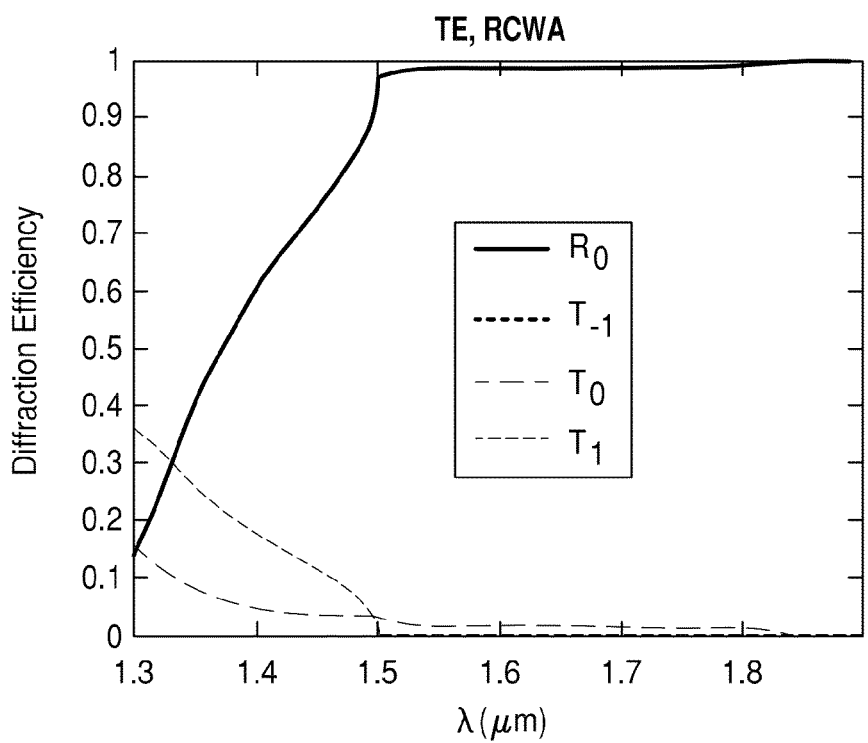
FIG. 17 illustrates a calculated spectral response of the device of FIG. 15.

FIG. 17 illustrates the diffraction efficiency spectrum of the waves of chief interest for TE-polarized incident light at normal incidence, with the computed results found by application of RWCA as described in Example 1. At normal incidence (θ=0), the Rayleigh anomaly occurs at wavelength $\lambda_R=n_s\Lambda$=1.5 μm, as evident in FIG. 17.

Figure 14:
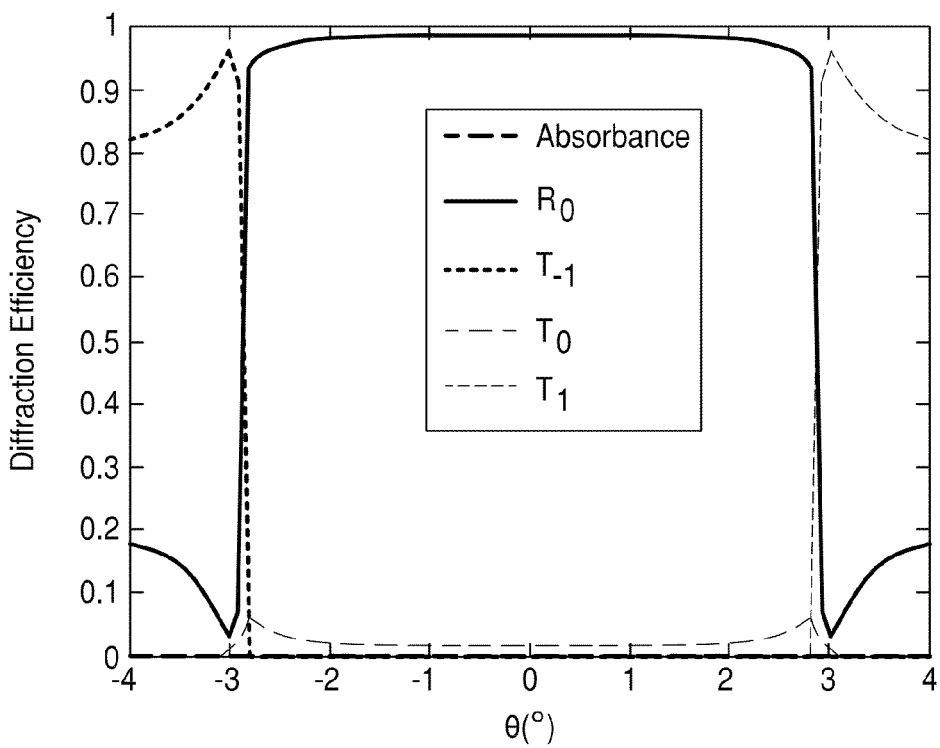
FIG. 14 illustrates a calculated angular spectrum of the device of FIG. 7.
Figure 16:
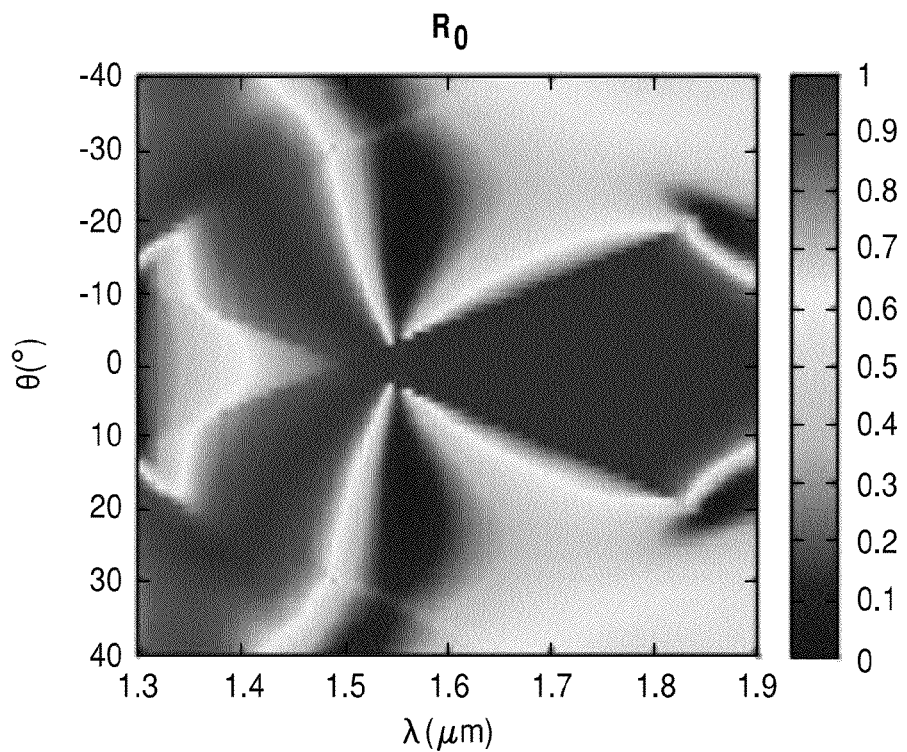
FIG. 16 illustrates an angle-wavelength 2D plot of zero-order reflectance $R_0$ of the device of FIG. 15.

Correspondingly, for an arbitrary wavelength, the $T_1$ wave begins propagating at a Rayleigh angle expressed according to Equation (2) above. Thus, at λ=1550 nm, $\theta_R$=2.9°. FIG. 14 shows the attendant angular spectrum. A high-efficiency (over 95%) flat-top reflectance spectrum with extremely sharp angular edges was observed. The rapid rise in the diffraction efficiency of the substrate orders is ≥95% in this case. This efficiency is high across an angular band spanning a few degrees, as shown in FIG. 14. Again, the zero-order transmittance $T_0$ is low near the filter edges as the first-order draws most of the power. FIG. 16 illustrates an angle-wavelength 2D plot of zero-order reflectance $R_0$ for the device.

EXAMPLE 4

Optical Filter

An optical filter according to one embodiment described herein was prepared as follows. FIG. 1 schematically illustrates the model of the optical filter, which is defined by a Rayleigh reflector device described herein. The angle of incidence θ is variable, generating the +1 diffraction order denoted as $T_1$ in the substrate for the numerical regimes treated. The period is sufficiently small such that only the zero-order transmitted ($T_0$) and reflected ($R_0$) waves propagate at normal incidence. The grating fabrication commenced by sputtering a film of amorphous silicon (a-Si) on a clean glass substrate. The film was characterized by ellipsometry to determine its thickness and index of refraction. After spin coating a layer of photoresist (PR) on the a-Si film, patterning using a holographic interferometer operating at a wavelength of 266 nm was performed. With the PR as a mask, the a-Si layer is etched partially to form a 320-nm deep grating, leaving the sublayer next to the substrate as shown in FIG. 1. Upon inspection by atomic force microscopy (AFM), the experimental parameters provided were $\Lambda=1028$ nm, $F=0.43$, and $d_g=319$ nm.

Figure 18:
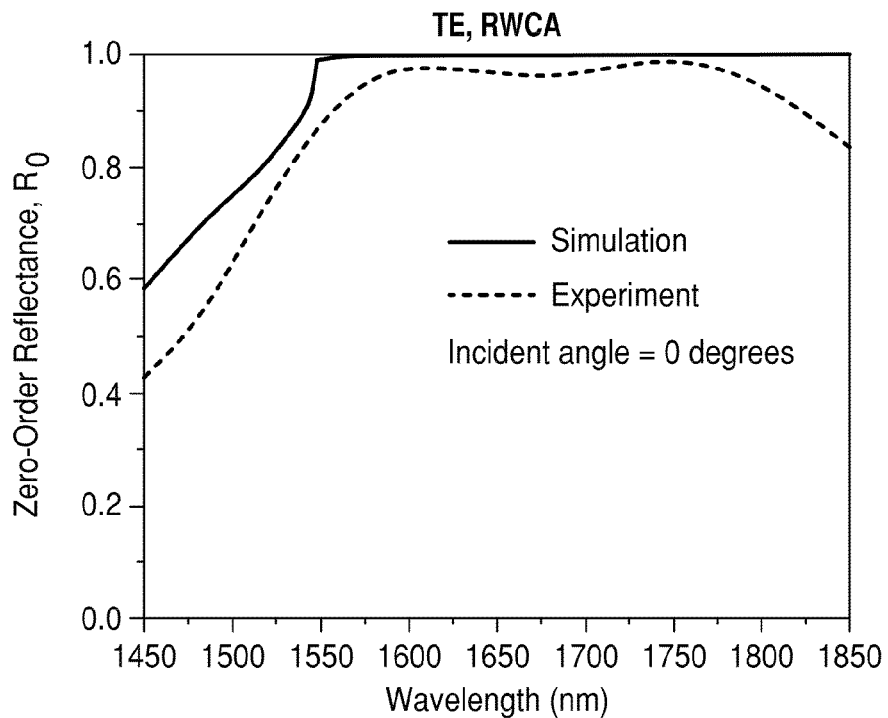
FIG. 18 illustrates theoretical and experimental spectral responses of a Rayleigh reflector device according to one embodiment described herein.

FIG. 18 shows theoretical and experimental spectra at normal incidence. In the computation, optimized design parameters were used, yielding a flat spectrum with $R_0=1$ across a 300-nm range. RCWA as described in Example 1 was used for theoretical computations. Experimentally, a wideband reflector with spectral efficiency >95% across an approximately 220-nm wavelength range was obtained. This device may be used as a GMR reflector with only $R_0$ prevailing above the Rayleigh wavelength ($4=n_s\Lambda=1548$ nm) at normal incidence. For an arbitrary operating wavelength, the onset of the $T_1$ substrate wave occurs at the Rayleigh angle expressed as $\sin\theta_R=-n_s+\lambda/\Lambda$. For example, in one embodiment, if the operating wavelength is 1620 nm, the diffraction efficiency of $R_0$ is transferred to $T_1$ at $\theta_R=4°$.

Figure 19:
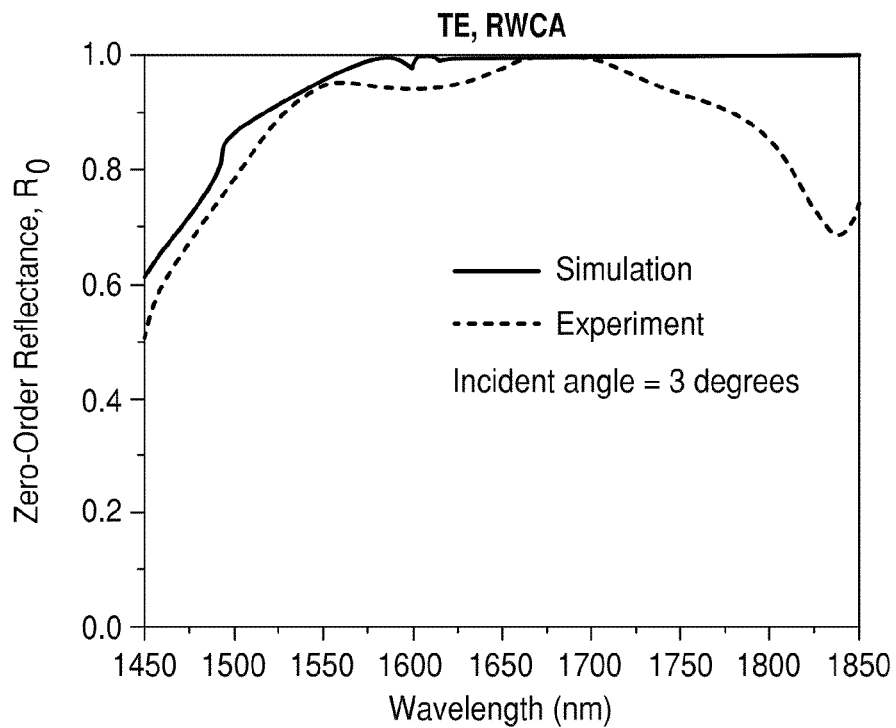
FIG. 19 illustrates theoretical and experimental spectral responses of a Rayleigh reflector device according to one embodiment described herein.
Figure 20:
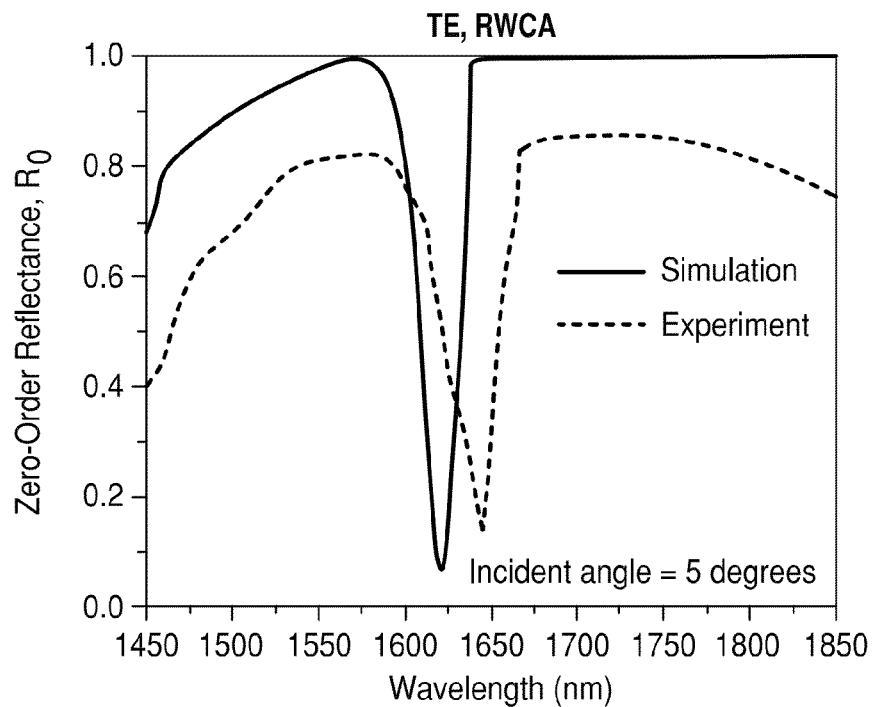
FIG. 20 illustrates theoretical and experimental spectral responses of a Rayleigh reflector device according to one embodiment described herein.
Figure 21:
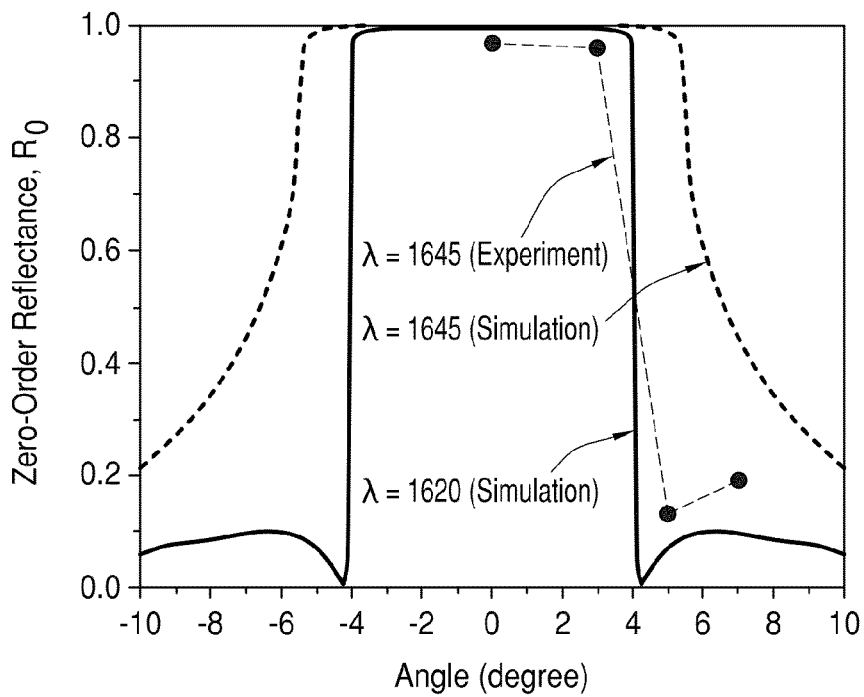
FIG. 21 illustrates theoretical and experimental spectral responses of a Rayleigh reflector device according to one embodiment described herein.

To experimentally verify the predicted effect, spectra were measured across the same wavelength band for numerous selected angles of incidence. FIG. 19 and FIG. 20 show the spectral responses at the incident angles of 3° and 5°, respectively. In the experimental measurements, it was observed that when the incident angle changes from about 3° to 5°, the diffraction efficiency of $R_0$ drops from about 96% to 13% at $\lambda=1645$ nm. According to simulation, the operating wavelength at which the minimum reflectance occurs at an incident angle of about 5° is 1620 nm, which varies from the experimental result, as seen in FIG. 20. Again not intending to be bound by theory, it is believed that the deviation may be attributable to differences in the experimental and model device parameters. FIG. 21 provides experimental results and computed results at different operating wavelengths. Although FIGS. 18-21 demonstrate deviation between theory and experiment, the existence of a sharp efficiency exchange is experimentally demonstrated in these embodiments. Again not intending to be bound by theory, it is believed that spectral measurements at smaller angular intervals are expected to provide better match between theory and experiment.

Various embodiments of the present invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

That which is claimed is:

1. A Rayleigh reflector device comprising:
   a substrate; and
   a grating layer disposed on the substrate, the grating layer comprising a periodic grating structure and a sublayer beneath the grating structure and adjacent to the substrate,
   wherein the sublayer has a thickness of less than about 200 nm,
   wherein the device exhibits guided-mode resonance effects and a Rayleigh anomaly, and
   wherein the device exhibits a flat-top angular reflectance spectrum having a drop in reflectance of incident electromagnetic radiation at an angle corresponding to the Rayleigh anomaly, the drop corresponding to a transition from an evanescent wave to a guided substrate wave.

2. The device of claim 1, wherein the sublayer has a thickness of less than about 100 nm.

3. The device of claim 1, wherein the sublayer has a thickness between about 40 nm and about 80 nm.

4. The device of claim 1, wherein the substrate has a first refractive index and the grating layer has a second refractive index different than the first refractive index, the first refractive index being lower than the second refractive index.

5. The device of claim 1, wherein the grating layer is formed from silicon.

6. The device of claim 1, wherein the grating layer is formed from germanium.

7. The device of claim 1, wherein the periodic grating structure comprises a two-dimensional periodic grating structure.

8. The device of claim 1, wherein the device further comprises one or more additional layers disposed between the substrate layer and the grating layer.

9. The device of claim 1, wherein the device is an optical coupler.

10. The device of claim 9, wherein the device is a substrate wave coupler.

11. The device of claim 1, wherein the device is a flat-top angular reflector or a flat-top angular filter.

12. The device of claim 1, wherein the device diffracts incident radiation from an $R_0$ wave into a $T_1$ wave.

13. The device of claim 1, wherein the device exhibits a diffraction efficiency of a zero-order reflection of at least about 85% at angles of incident electromagnetic radiation between about −10 degrees and about 10 degrees.

14. The device of claim 1, wherein the device exhibits an onset of a $T_1$ substrate wave at the Rayleigh angle expressed as $\sin\theta_R=-n_s+\lambda/\Lambda$.

15. The device of claim 1, wherein the device exhibits the Rayleigh anomaly at normal incidence of light having a wavelength $\lambda_R$, and wherein $\lambda_R=n_s\Lambda$.

* * * * *